A. THEERMAN.
STEERING MECHANISM.
APPLICATION FILED OCT. 20, 1911.
1,025,432.
Patented May 7, 1912.
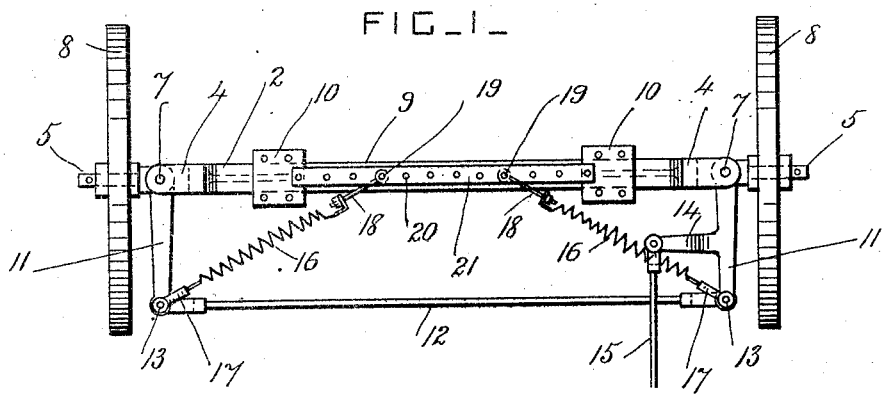
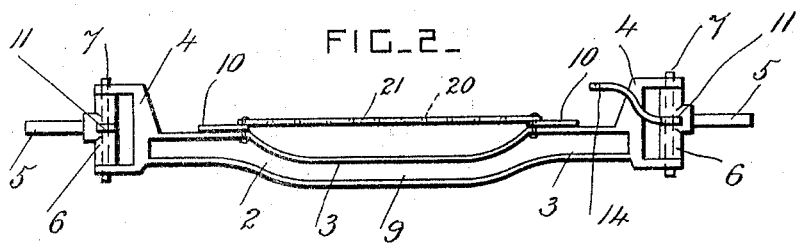

UNITED STATES PATENT OFFICE.

ALBERT THEERMAN, OF DIKE, IOWA.

STEERING MECHANISM.

1,025,432.  Specification of Letters Patent.  Patented May 7, 1912.

Application filed October 20, 1911. Serial No. 655,779.

*To all whom it may concern:*

Be it known that I, ALBERT THEERMAN, a citizen of the United States, residing at Dike, in the county of Grundy and State of Iowa, have invented certain new and useful Improvements in Steering Mechanism; and I do hereby declare the following to be a full, clear, and exact description of the invention, such as will enable others skilled in the art to which it appertains to make and use the same.

This invention relates to steering mechanism for automobiles; and it consists in the novel construction and combination of the parts hereinafter fully described and claimed.

In the drawings, Figure 1 is a plan view of the front axle and ground wheels of an automobile provided with steering mechanism according to this invention. Fig. 2 is a front view of the axle and anchor-bar.

The front axle 2 is formed of a web plate having flanges 3 projecting at its top and bottom on each side of it. The end portions of the axle are provided with brackets 4, and 5 are the axle spindles having heads 6 which are pivoted by vertical pivots 7 to the brackets 4.

The ground wheels 8 are of any approved construction, and they are mounted on the spindles 5. The middle part of the axle has an offset portion 9 which is arranged below the level of its end portions. The end portions of the axle 2, at the ends of its offset portion, are provided with plates 10. These plates are secured to the upper flanges of the axle, and they afford a means for connecting the axle to the vehicle springs which support the body of the automobile, and which are not shown.

The heads 6 of the axle spindles are provided with rearwardly projecting arms 11, and 12 is a coupling-rod pivoted to the said arms by pins 13. One of the arms 11 has a laterally projecting arm 14 for the attachment of the steering-rod 15, a portion of which is shown.

In order to facilitate the operation of steering the automobile, springs 16 are provided. These springs are helical springs, and each spring has a double-eye 17 at one end for connecting it to one of the pins 13. The other end of each spring is provided with an eye-bolt 18 having a pin 19. This eye-bolt and its pin are adapted to engage with any hole of a series of holes 20 in an anchor-bar 21, which is secured to the plates 10, and which extends between the said plates above the offset portion of the axle. The two springs 16 are arranged in an inclined or diagonal position between the ends of the coupling-rod and the middle part of the anchor-bar 21, and they normally hold the axle spindles in line with each other and with the axle. These springs facilitate the operation of steering, as they restore the axle spindles to their normal positions when they have been moved to a slight extent therefrom by the wheels striking against stones or other obstacles. The angularity and strength of the springs can be varied and adjusted by placing the pins of the eye-bolts in engagement with different holes in the anchor-bar, and the axle is not weakened in any way as no additional holes are formed in it.

What I claim is:

In a steering mechanism, the combination, with an axle having an offset middle portion arranged below the level of its end portions and having also plates secured to the upper side of its end portions, axle spindles for the road wheels pivoted to the end portions of the axle and provided with rearwardly projecting arms, and a coupling-rod pivoted to the said arms; of an anchor-bar secured between the said plates above the offset middle portion of the axle and provided with a series of holes, and helical springs arranged in inclined or diagonal positions and connected at one end to the pivot pins of the said arms and having at their other ends eye-bolts for engaging with the holes in the anchor-bar.

In testimony whereof I have affixed my signature in the presence of two witnesses.

ALBERT THEERMAN.

Witnesses:
JEPPE J. SCHULTZ,
SHERMAN PORTER.